(12) United States Patent
Nuernberg et al.

(10) Patent No.: US 12,700,175 B2
(45) Date of Patent: Aug. 4, 2026

(54) METHOD FOR GENERATING INPUT DATA FOR A MACHINE LEARNING MODEL

(71) Applicant: Robert Bosch GmbH, Stuttgart (DE)

(72) Inventors: Thomas Nuernberg, Leonberg (DE); Florian Faion, Staufen (DE); Thomas Michalke, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 18/326,196

(22) Filed: May 31, 2023

(65) Prior Publication Data

US 2023/0394757 A1 Dec. 7, 2023

(30) Foreign Application Priority Data

Jun. 1, 2022 (DE) ..................... 10 2022 205 572.1

(51) Int. Cl.
G06T 17/00 (2006.01)
G06T 7/50 (2017.01)

(52) U.S. Cl.
CPC .............. G06T 17/00 (2013.01); G06T 7/50 (2017.01); *G06T 2207/20036* (2013.01); *G06T 2207/20081* (2013.01); *G06T 2207/20228* (2013.01)

(58) Field of Classification Search
CPC . G06T 17/00; G06T 7/50; G06T 2207/20036; G06T 2207/20081;

(Continued)

(56) References Cited

U.S. PATENT DOCUMENTS

| | | | | |
|---|---|---|---|---|
| 10,514,462 B2 * | 12/2019 | England | .............. | G05D 1/0221 |
| 2009/0232388 A1 * | 9/2009 | Minear | ..................... | G06T 7/32 |
| | | | | 382/154 |

(Continued)

FOREIGN PATENT DOCUMENTS

CN 112614174 A * 4/2021 ............... G06T 7/11

OTHER PUBLICATIONS

Dimitrievski, M., Veelaert, P., Philips, W. (2018). Learning Morphological Operators for Depth Completion. In: Blanc-Talon, J., Helbert, D., Philips, W., Popescu, D., Scheunders, P. Advanced Concepts for Intelligent Vision Systems. ACIVS 2018. Lecture Notes in Computer Science(), vol. 11182. Springer (Year: 2018).*

(Continued)

*Primary Examiner* — Kee M Tung
*Assistant Examiner* — Xiaoming Wei
(74) *Attorney, Agent, or Firm* — Maginot, Moore & Beck LLP

(57) ABSTRACT

A method of generating input data for a machine learning model includes determining, for a sensor, a point cloud with points detected by the sensor from surfaces in the environment of the sensor, generating a preliminary target sensor point cloud for a target sensor by transforming, for the sensor, points of the determined point cloud into points from the perspective of the target sensor according to the relative position of the target sensor to the sensor, generating a target sensor point cloud for the target sensor by using the preliminary target sensor point cloud, wherein points which, due to one or more surfaces for which points exist in the preliminary target sensor point cloud, are not detectable by the target sensor are eliminated in the target sensor point cloud, and using the target sensor point cloud as input for the machine learning model.

14 Claims, 4 Drawing Sheets

(58) Field of Classification Search
CPC ........... G06T 2207/20228; G06T 15/20; G06T
2210/56; G06T 19/00; G06N 3/045;
G06N 3/047; G06N 3/0475; G06N 3/09;
G06N 3/094; G06V 20/588; G06V
10/267; G06V 10/34; G06V 10/774;
G06V 10/80; G06V 20/58; G06V 20/582;
G06V 20/64
See application file for complete search history.

(56) References Cited

U.S. PATENT DOCUMENTS

| | | | | |
|---|---|---|---|---|
| 2010/0053163 A1* | 3/2010 | Wallace | ................. | G06T 15/30 |
| | | | | 345/427 |
| 2020/0202208 A1* | 6/2020 | Li | .......................... | G06N 20/00 |
| 2021/0366205 A1* | 11/2021 | Juppe | ....................... | G06T 5/73 |
| 2023/0031473 A1* | 2/2023 | Mati | ......................... | G06T 7/80 |

OTHER PUBLICATIONS

Chen et al. machine translation of CN 112614174A (Year: 2021).*
Chen, machine translation of CN-112614174-A (Year: 2021).*
Dimitrievski, M., Veelaert, P., Philips, W. "Learning Morphological
Operators for Depth Completion". In: Blanc-Talon, J., Helbert, D.,
Philips, W., Popescu, D., Scheunders, P. (eds) Advanced Concepts
for Intelligent Vision Systems. ACIVS 2018. Lecture Notes in
Computer Science(), vol. 11182. Springer (Year: 2018).*
Xavier Morin-Duchesne, Michael S Langer, "Simulated LiDAR
Repositioning: a novel point cloud data augmentation method",
Nov. 20, 2021, arXiv:2111.10650v1 (Year: 2021).*

* cited by examiner

METHOD FOR GENERATING INPUT DATA FOR A MACHINE LEARNING MODEL

This application claims priority under 35 U.S.C. § 119 to patent application no. DE 10 2022 205 572.1, filed on Jun. 1, 2022 in Germany, the disclosure of which is incorporated herein by reference in its entirety.

BACKGROUND

The present disclosure relates to methods of generating input data for a machine learning model.

As the complexity of perception tasks increases, more and more complex machine learning models, such as neural networks with complex architectures, are typically deployed, which in turn require increasing amounts of annotated training data. These training data must also be highly diverse and contain all situations that arise, if possible, in order to achieve the best possible ability to generalize the system to unknown data and avoid overfitting. For this purpose, large measurement campaigns are planned and carried out, in which large amounts of data are recorded with a measurement vehicle in many different situations and locations. The (manual) annotation of the training input data recorded in this way is then performed with the associated desired output data (i.e. the training output data, i.e. ground truth data) of the perception task. The creation of such a data set is accordingly associated with high time expenditure and costs.

Accordingly, it is desirable to be able to utilize such a data set to train a variety of machine learning models.

SUMMARY

According to various embodiments, a method of generating input data for a machine learning model is provided, comprising the determination, for at least one sensor, of a point cloud with points detected by the sensor from surfaces in the environment of the sensor, generating a preliminary target sensor point cloud for a target sensor by transforming, for the at least one sensor, points of the determined point cloud into points from the perspective of the target sensor according to the relative position of the target sensor to the at least one sensor, generating a target sensor point cloud for the target sensor using the preliminary target sensor point cloud, wherein points which, due to one or more surfaces for which points exist in the preliminary target sensor point cloud, are not detectable by the target sensor are eliminated in the target sensor point cloud, and using the target sensor point cloud as input for the machine learning model.

The method described above allows for training of a machine learning model and inference using the machine learning model when the machine learning model is to be trained or has been trained on the sensor data from the perspective of a target sensor, but only sensor data from the perspective of at least one other sensor are available.

It should be noted that the application case can be that the target sensor point cloud is generated from one or more different point clouds than the preliminary target sensor point cloud. In an exemplary form, the preliminary target sensor point cloud is generated from LiDAR point clouds, the surfaces are determined from the preliminary target sensor point cloud, and the target sensor point cloud is then generated from one or more radar point clouds, wherein the surfaces are taken into account (i.e., points that are not recorded or removed, which are not detectable for the (radar) target sensor based on the determined surfaces). However, it is also possible to simply generate the target sensor point cloud from the preliminary target sensor point cloud by removing non-detectable surface points and adding surface points as necessary.

Various embodiment examples are specified below.

Embodiment example 1 comprises a method of generating input data for a machine learning model, as described above.

Embodiment example 2 is a method according to embodiment example 1, wherein, when generating the target sensor point cloud, the preliminary target sensor point cloud is supplemented with points of surfaces for which surface points are included in the preliminary target sensor point cloud, and which are detectable for the target sensor if the particular surface is present.

Thus, more realistic input data is generated from the perspective of the target sensor because it receives the points that would be detected by the target sensor.

Embodiment example 3 is a method according to embodiment example 1 or 2, comprising the generation of the target sensor point cloud by generating a depth image representing the location of points of the preliminary target sensor point cloud from the perspective of the target sensor, morphologically opening the depth image, and generating the target sensor point cloud according to the morphologically opened depth image.

In this way, it can be efficiently determined which points are visible to the target sensor because, due to the morphological opening for representations of points in the depth image that are obscured, the depth information is corrected such that only points detectable by the target sensor are represented from the depth image.

Embodiment example 4 is a method according to embodiment example 1 or 2, comprising the generation of the target sensor point cloud by generating a disparity image representing the location of points of the preliminary target sensor point cloud from the perspective of the target sensor, morphologically closing the disparity image, and generating the target sensor point cloud according to the morphologically closed disparity image.

Similarly to the depth image, such a use of a disparity image allows for efficient determination of the points that are visible to the target sensor.

Embodiment example 5 is a method according to any of the embodiment examples 1-4, comprising the determination of a respective point cloud for each of multiple sensors, using points detected by the sensor from surfaces in the vicinity of the sensor and generating the preliminary target sensor point cloud for a target sensor by transforming, for each of the multiple sensors, points of the respective determined point cloud into points from the perspective of the target sensor according to the relative position of the target sensor to the sensor, and assembling the transformed points into the preliminary point cloud.

By doing so, a more complete image can be achieved for the target sensor because surface points that are not detectable for individual sensors of the multiple sensors can be detectable (i.e., visible, for example) for the target sensor.

Embodiment example 6 comprises a method according to any of the embodiment examples 1-5, comprising the generation of a respective target sensor point cloud for a target sensor arrangement having multiple target sensors and using the generated target sensor point clouds as input for the machine learning model.

Thus, with the method described above, sensor data can also be generated for multiple target sensors (wherein each is generated as described above, i.e., the method is executed, for example, several times, and the results are concatenated).

In other words, sensor data of a single sensor is not emulated, but rather this takes place using the sensor data of a whole sensor arrangement.

Embodiment example 7 is a method according to any of the embodiment examples 1-5, comprising training the machine learning model to process sensor data from the perspective of the target sensor using the target sensor point cloud.

The target sensor point cloud can be used in particular for training the machine learning model. Thus, the target sensor can be trained even if no sensor data has been captured from its perspective.

Embodiment example 8 is a method according to embodiment example 7, comprising the acquisition of ground truth information for the points of the point cloud determined for the at least one sensor, transforming the ground truth information into ground truth information for the points of the target sensor point cloud, and training the machine learning model using supervised learning by using the target sensor point cloud as training input data and the transformed ground truth information.

Thus, the machine learning model can be trained with monitoring by ground truth information to process sensor data that were generated or are present from the view of the target sensor for the original point cloud or point clouds.

Embodiment example 9 comprises a method according to embodiment examples 7 or 8, comprising the generation of a respective target sensor point cloud for a target sensor arrangement having multiple target sensors, and training the machine learning model using the generated target sensor point clouds.

Thus, a machine learning model can be trained to process sensor data from a sensor arrangement.

Thus, with the method described above, sensor data can also be generated for multiple target sensors (wherein each is generated as described above, i.e., the method is executed, for example, multiple times, and the results are concatenated), which sensor data can then be used to train a machine learning model. In other words, sensor data of a single sensor is not emulated, but rather, this method is performed using the sensor data of a whole sensor arrangement.

Embodiment example 10 is a sensor data processing system that is configured to carry out a method according to any one of the embodiment examples 1 to 9.

Embodiment example 11 is a computer program with commands that, when executed by a processor, cause the processor to perform a method according to one of the embodiment examples 1 to 9.

Embodiment example 12 is a computer-readable medium that stores commands which, when executed by a processor, cause the processor to perform a method according to one of the embodiment examples 1 to 9.

BRIEF DESCRIPTION OF THE DRAWINGS

In the drawings, similar reference numbers generally refer to the same parts throughout the various views. The drawings are not necessarily to scale, wherein emphasis is instead generally placed on representing the principles of the disclosure. In the following description, various aspects are described with reference to the following drawings.

The following detailed description relates to the accompanying drawings, which show, for clarification, specific details and aspects of this disclosure in which the disclosure can be implemented. Other aspects can be used, and structural, logical, and electrical changes can be made without departing from the scope of protection of the disclosure. The various aspects of this disclosure are not necessarily mutually exclusive since some aspects of this disclosure can be combined with one or more other aspects of this disclosure in order to form new aspects.

Various examples are described in more detail below.

In machine learning, a function that maps input data to output data is learned. In supervised learning (for example, training a neural network or another model), an input data set (also referred to as a training data set) that provides a desired output (e.g., a desired classification of the input data) for each input is used to determine the function in order to best map this assignment of inputs to outputs.

Figure 1:
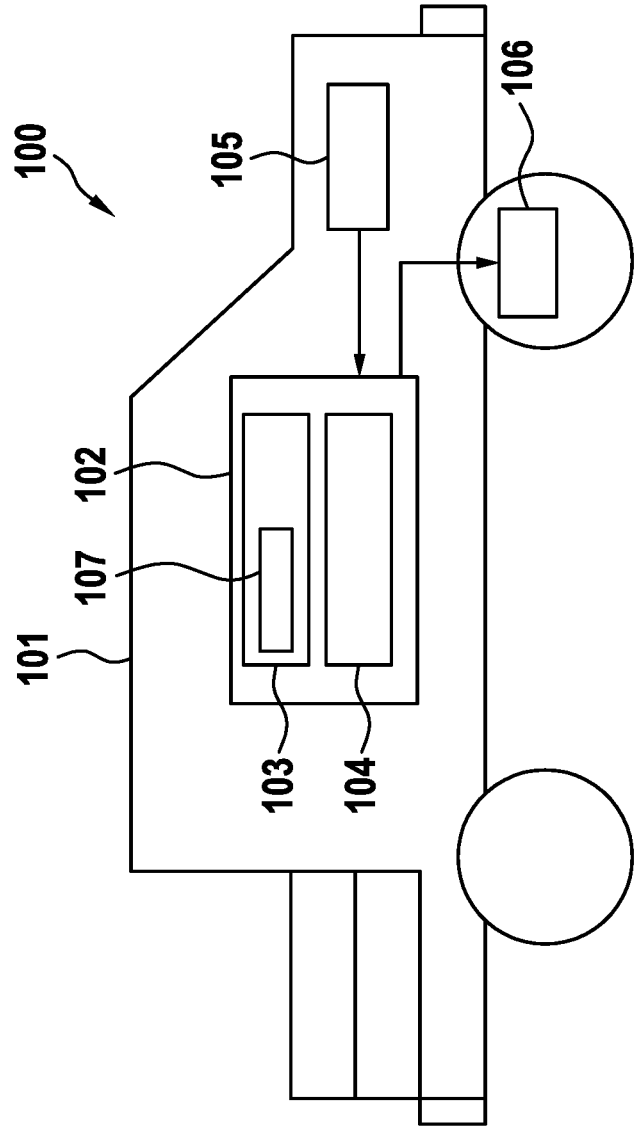
FIG. 1 shows a vehicle.

Object detection, possibly including classification, or semantic segmentation in digital images, e.g., for autonomous driving, is an example of an application of such a machine-learned function, as illustrated in FIG. 1.

FIG. 1 shows an (e.g., autonomous) vehicle 101.

It should be noted that images or image data are very generally understood as a collection of data representing one or more objects or patterns in the following text. Image data can be provided by sensors that measure visible or invisible light, such as infrared or ultraviolet light, ultrasonic or radar waves, or other electromagnetic or acoustic signals.

In the example of FIG. 1, a vehicle 101, e.g., a car or truck, is provided with a vehicle controller 102.

The vehicle controller 102 comprises data processing components, e.g., a processor (e.g., a CPU (central processing unit)) 103 and a memory 104 for storing control software according to which the vehicle controller 102 operates, and data processed by the processor 103.

For example, the saved control software (computer program) comprises instructions that, when executed by the processor, cause the processor 103 to implement a machine learning (ML) model 107.

The data stored in the memory 104 can, for example, include sensor data captured by one or more sensors 105. For example, the one or more sensors 105 can scan the environment of the vehicle 101 using LiDAR.

Based on the sensor data, vehicle controller 102 can determine whether and what objects, such as fixed objects, for example traffic signs or road markings, or movable objects such as pedestrians, animals, and other vehicles, are present in the vicinity of vehicle 101.

The vehicle 101 can then be controlled by the vehicle controller 102 in accordance with the object determination results. For example, the vehicle controller 102 can control an actuator 106 (e.g., a brake) in order to control the speed of the vehicle, e.g., to brake the vehicle. The vehicle controller 102 can thus perform tasks for an Advanced Driver Assistance System (ADAS) and/or for Autonomous Driving (AD).

Such tasks typically require accurate perception and representation of the environment of the vehicle. Common problems include, for example, object detection, semantic segmentation, or the determination of an occupancy grid from sensor data of one or more sensors (LiDAR, radar, video, etc.) 105. Especially recently, these disciplines have made significant progress with data driven ML approaches such as deep learning. Such approaches are characterized in that the parameters of a perception system (i.e., an ML model for a perception task such as object detection or semantic segmentation) can be trained using supervised learning, i.e., based on an annotated data set consisting of input data and associated desired starting data (referred to as ground truth, supervised learning).

A major challenge in the design and training of an ML model is the desired capability of the ML model for generalization, i.e. the capability of the trained perception system in a perception task to also supply correct results for input data or situations that differ from the training input data or situations of the training data set. These differences can consist of fundamental differences on the one hand. For example, a video object detector that was trained only with red vehicles is typically not able to detect a blue vehicle. On the other hand, however, more subtle differences, such as a slight rotation or reduction of the resolution of a sensor that supplies the training data over a sensor that provides the input data for later operation (that is, the inference) can significantly decrease the quality of the results of the ML model.

In order to improve the ability to generalize and increase the amount of training data in a cost-effective manner, data augmentation methods are used to infer further training data from the existing data. Known approaches include, for example, the geometric transformation or distortion of the sensor data, or the addition of interference to generate additional training input data for the ML model. Nonetheless, the ability to generalize ML-based perception systems remains a major challenge, as it is hardly possible to model all conceivable variations of the input data even by augmentation.

Since the creation of a training data set involves high effort and costs for these reasons, it is desirable to use available training data sets in as many applications and projects as possible. At the same time, however, annotated data whose properties and distribution are as close to the input data as possible during the practical use of the system (i.e. inference) is required for optimum training of perception systems.

Furthermore, since different test carriers and sensor configurations are generally used in different projects and applications, this limits broad applicability of training data sets. Specifically, the data of different test carriers/projects can differ from one another or from the data of a training data set in the following points, among other things:

Various mounting positions of the sensors (extrinsic calibration), different intrinsic sensor properties despite identical sensor models (intrinsic calibration), deviating number of sensors, different sensor models, each with different ranges, resolutions, noise behavior, etc.

Even if a vehicle is used analogously to the vehicle in the measurement campaign, or even if the identical vehicle is used, the training data obtained from it can differ from the annotated training data from a measurement campaign carried out in the past in some of the points mentioned. In addition, the properties and distributions of the data in an application can also change over time, for example because the final number, the specific sensor models, or their exact installation positions are not determined from the outset. In addition, a sensor designed for the application may not be available at all at the start of a project and may only become available for use during the course of the project.

One approach to domain adaptation of training data consists of Generative Adversarial Networks (GANs), which learn the mapping of the data from the domain of the training data set into the target domain of the perception system. However, for this purpose, a further annotated data set from the target domain is required in addition to the original training data set in order to learn the mapping; however, this data set can be smaller in size. However, the complexity of the training is significantly increased due to the required expanded network structure of the perception system, and it is still necessary for annotated data of the target domain to be available, which leads to additional costs, especially for variable sensor configurations.

According to various embodiments, an approach that involves training an ML model (especially for a perception task, i.e., an ML-based perception system) is therefore provided; specifically, for training data from a particular sensor (or sensor arrangement having multiple sensors), wherein the training data set that is used for the training does not necessarily need to be recorded by the same sensor (or sensor arrangement) as the sensor or sensor arrangement that is employed in the practical use of the perception system.

In the following text, we will refer to one target sensor that provides the input data that the ML model should be able to process for the sake of simplicity, although an arrangement of target sensors can also replace the target sensor. Conversely, the term target sensor arrangement can also refer to the possibility that it only contains one (target) sensor. The sensor or sensors used to record sensor data (e.g., in a measurement campaign) that are then used for training is/are referred to as a training sensor or training sensors.

In order to train an ML model to process data of a target sensor in practice while using sensor data provided by training sensors (e.g., raw sensor data), the associated annotations of the training data set are transformed for training both the sensor data and—if applicable to the particular application—in such a manner that the properties and distributions of the input data expected in practice are emulated as closely as possible. Therefore the perception system is trained with emulated data that better corresponds to the data of the target application. Accordingly, the input data differs less from the training data in practical use, and the perception system needs to perform fewer generalizations.

With this approach, available data sets can be more easily used to train perception systems in applications with other sensor (arrangement) configurations. In this manner, the high cost of creating new training data sets, particularly in cases with highly variable sensor (arrangement) configurations, can be avoided while simultaneously achieving optimal training of perception systems.

Analogously, the described approach can significantly increase the quality of the results of perception systems in applications for which no specific training data sets are available; for example because the corresponding sensory system is not yet available, or because the creation of a training data set would be uneconomical.

In the following, training of a deep learning object detector (as an example for ML model 107) for using a LiDAR sensor arrangement (as an example for sensor 105) is described as an embodiment example.

Figure 2:
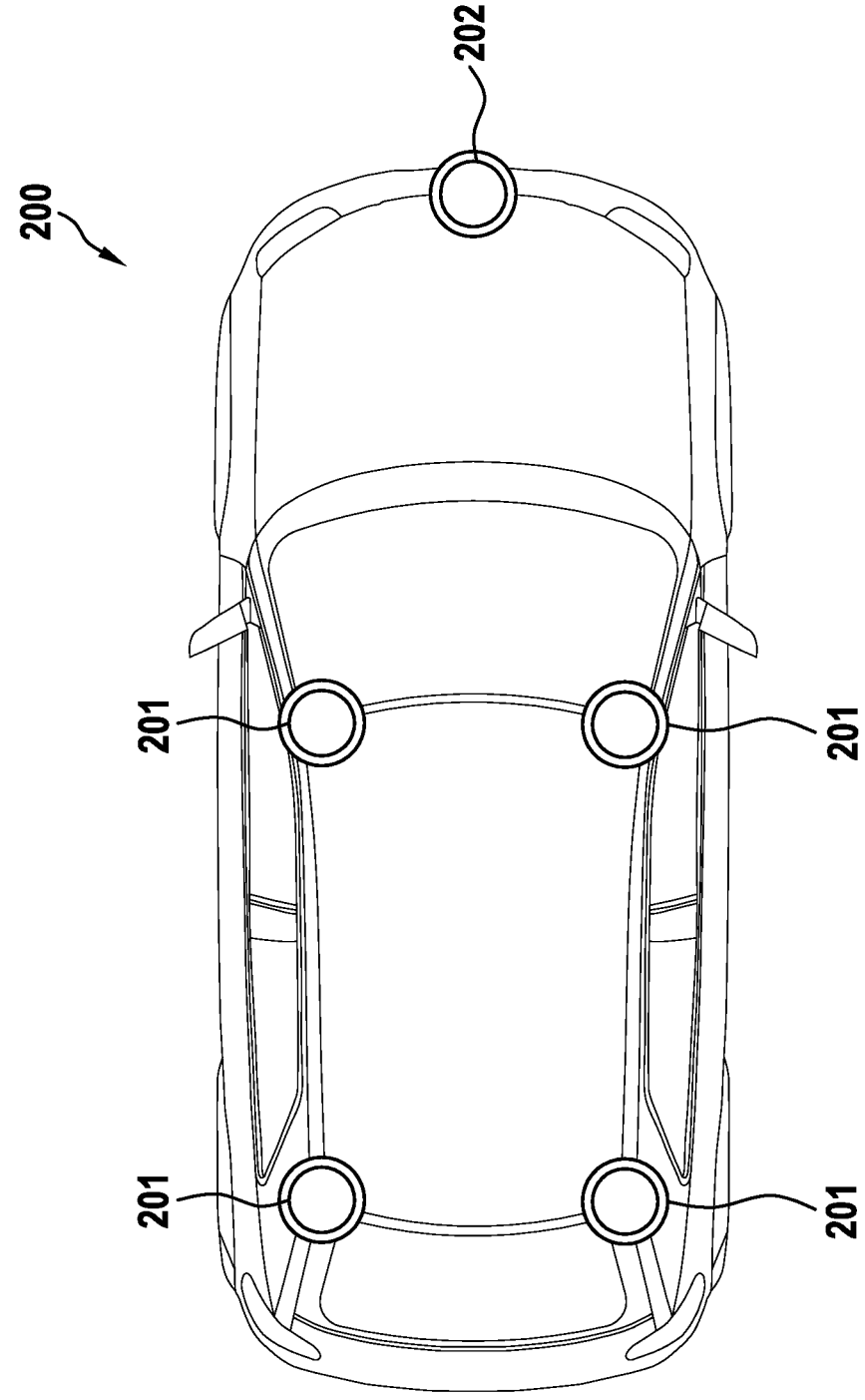
FIG. 2 shows one example of positioning an arrangement of training sensors and a target sensor on a vehicle.

FIG. 2 shows one example of positioning an arrangement of training sensors 201 (e.g., on the vehicle roof) and a target sensor 202 on a vehicle 200.

Thus, in this embodiment example, sensor data (with associated annotations) provided by a LiDAR sensor arrangement 201 (i.e., the training sensors or the training sensor arrangement) is intended to be used to train a target sensor specific deep learning object detector, wherein the target sensor 202 in this example differs from the training sensors both in terms of its installation position and with regard to the angular resolution and the viewing area.

The sensor data with annotations provided by the training sensors are referred to as the original training data set. From this, a target sensor training data set for the ML model is generated so that it is able to perform the respective task (here, object detection as an example) when it receives sensor data as input data provided by the target sensor 202, i.e., in this embodiment example, training a perception system specifically for sensor data from the target sensor 202 in the front bumper.

Therefore, in this example, the original training data set consists of 3D point clouds (one per training sensor 201) and an associated list of ground truth object detections, wherein each detection contains different object properties (such as e.g. classification), but at least the object location.

Figure 3:
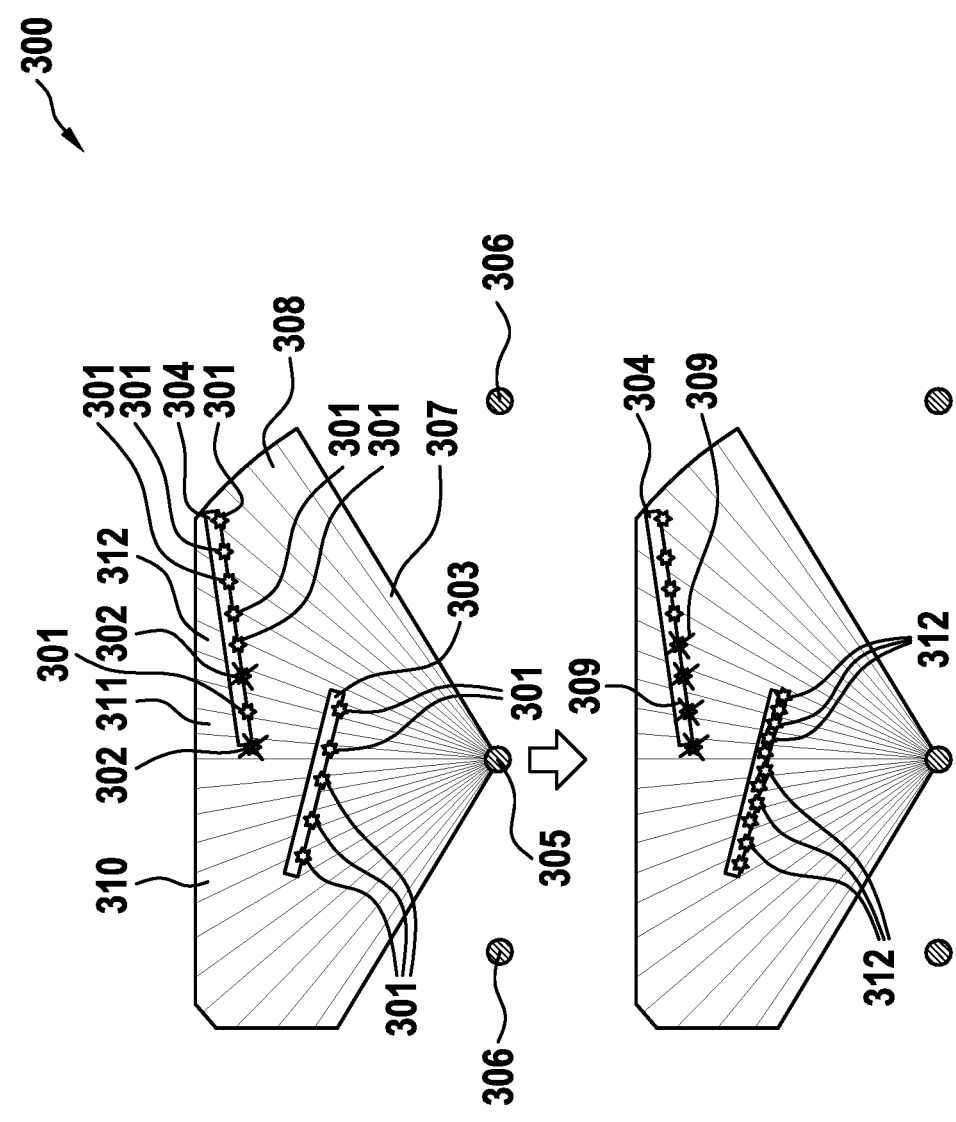
FIG. 3A and FIG. 3B illustrate the emulation of a target sensor training data set from an original training data set.

FIG. 3A and FIG. 3B illustrate the emulation of a target sensor training data set from an original training data set.

For simplicity of representation, only a two-dimensional section is viewed through the respective point clouds here; i.e. only a single elevation angle is viewed.

First, the individual 3D point clouds of the training sensors 201 are transformed into the coordinate system of the target sensor using the known installation positions of the individual sensors 201, 202, and possibly taking different measurement times and the self-movement of the measurement vehicle into account; that is, into the coordinate system; with the origin and orientation corresponding to the (assumed) installation position of the target sensor. The result is a preliminary version of the target sensor training data set. The points of the 3D point clouds of the training sensors are thereby transformed into the perspective of the target sensor.

In the present example, it is assumed that the training sensors (herein, two training sensors 306 as an example) have detected points 301, 302 on the surfaces 303, 304 of two objects.

In the illustration of FIG. 3A, these are already transformed into the coordinate system of the target sensor 305.

During the transformation, all 3D points from the point clouds that are outside the target sensor's viewing area 307 are immediately discarded (i.e., they are not included into or removed from the target sensor training data set). All remaining 3D points are initially included in the target sensor training data set. For this preliminary version of the target sensor training data set, a 2D depth image is then created (only one line of the depth image here due to the two-dimensional cross-section through the point cloud), wherein the horizontal axis corresponds to the azimuth angle and the vertical axis corresponds to the elevation angle. If a point of a point cloud of one of the training sensors 306 (and thus also in the current version of the target sensor training data set) is located at a respective (angle) position (from the view of the target sensor 305, i.e. in the coordinate system of the target sensor 305), the pixel value indicates the distance to the coordinate origin (i.e., the location of the target sensor 305). If a respective (angle) location does not have a point of a point cloud of one of the training sensors 306, the pixel value has a predetermined default value (e.g., a value representing infinity).

The discretization of the axes of the depth image is selected according to the desired angular resolution of the target sensor. The resolution is shown here by the lines 308 radiating from the target sensor position: Each sector in the viewing area 307 bounded by two such lines 308 corresponds to a pixel value (in this case, in the respective line of the depth image for the observed elevation angle, analogously for further elevation angles).

If more than one 3D point of the point clouds of the training sensors fall into the same discrete pixel of the depth image (i.e., within the same sector for a particular elevation angle), all points are discarded except for the one with the least distance to the origin of the coordinate. In this example, these are points 302.

Herein, the depth image initially contains pixel values (which are different from the default value) for the points 301.

Particularly for training sensors with low angular resolutions compared to the target sensor, numerous pixels in which no distance value is entered remain in the depth image that is filled in this manner. For these, the standard value, e.g. any large distance value—hereinafter referred to as D—is entered. However, this is not plausible in some cases: In sector 310, for example, where none of the points 301, 302 is present, there should actually be a depth value corresponding to the surface 303 as represented by the points 301 on the surface 303, but no point 301 is present for them in sector 310 from the point clouds of the training sensors. Furthermore, due to the possible parallax created by the different installation positions of the training and target sensors, 3D points that are actually obscured by other objects from the point of view of the target sensors can be selected: In the example shown, the depth value for the point on the rear surface 304 would be recorded in sectors 311 and 312, although it would actually be obscured by the front surface 303.

In order to determine these two cases of false pixel values in the depth image (standard value although a surface is present, or a distance value of a point of a surface, although it is obscured), the depth image is opened morphologically with a structural element, i.e., sequentially, the morphological operations of erosion and dilation are performed.

The result is shown in FIG. 3B: Pixel values for points 312 on the front surface 303 have been added so that, specifically for points 309 hidden from there, the pixel values have been overwritten.

The size of the structural element is chosen depending on the angular resolution of the target sensor 305 or the resolutions of the training sensors 306.

It should be noted that the points 312 that are newly generated by interpolation in this manner can be incorporated into the target sensor training data set, or can only be used to remove the obscured points 309 from the target sensor training data set (or to discontinue its generation for the target sensor training data set). For example, in the second case, all 3D points in whose associated pixels of the depth image would significantly decrease the distance (i.e., the pixel value) through morphological opening (e.g., negative change greater than a threshold) would be discarded.

The final target sensor training data set can be generated from the depth image by computing a 3D point for the target sensor training data set of the target sensor from the azimuth, elevation, and distance of the pixel for each pixel of the opened depth image, and thereby building the entire point cloud of the target sensor. For pixels with an associated and unrejected 3D point of the point cloud of the preliminary version of the target sensor training data set, these 3D points can also be adopted if desired. A 3D point is not calculated for pixels that still contain a distance value D even after morphological opening, as there is no surface detected by the training sensors.

As an alternative to using a depth image with morphological opening, equivalent results can be obtained by entering the 3D points into a disparity image (=inverse distance) and subsequently performing morphological closing (i.e., dilation with subsequent erosion). This can be performed analogously to using a depth image as described above.

The locations of the annotated ground truth object detections of the original training data set are transformed into the coordinate system of the target sensor analogously to the 3D point clouds. Detections that are out of the visual range of the target sensor can be discarded immediately. For the remaining object detections, it is checked whether the emulated 3D point cloud of the target sensor (i.e. the input data from the target sensor training data set) contains points of a detected object, e.g. by comparing the 3D points with the 3D object position.

Object detections without emulated 3D points of the target sensor are also discarded correspondingly.

To train a target sensor specific deep learning object detector, a target sensor training data set is emulated from the original training data set, as described above. This can optionally be performed once in advance, and the thereby generated target sensor training data set can be saved, or it can be performed as a pre-processing step while accessing the original training data during training. All other aspects of the training (architecture, (hyper)parameters, etc.) can be treated in a manner similar to what would take place in a training without such emulation. Only in case of augmentations is care taken to ensure that no data or labels are generated outside the visual range of the target sensor.

Therefore, when training an object detector for a multi-sensor target sensor arrangement, the above generation (emulation) of a target sensor training data set is performed for each target sensor of the target sensor arrangement, therefore—, multiple times in multiple target sensors. In this manner, specific training data is emulated for each individual target sensor, and can then be combined to train the entire target sensor arrangement.

The approach for training a sensor (arrangement)-specific perception system described above using the task of object detection with LiDAR sensor data can be extended to other tasks. In the context of semantic segmentation of LiDAR sensor data, the 3D point cloud of a target sensor can be emulated analogously to the described case of object detection from the 3D point clouds of the training sensors. Associated point-by-point annotated semantic labels can be produced from the original labels by creating an analogous, equally sized image with the semantic labels in addition to the depth image. With the definition of a ranking of semantic labels, this image can also be further processed by means of morphological opening in order to subsequently read the semantic labels for the input training data for the target sensor.

If 3D data, such as those from a LiDAR sensor or stereo video recording, are available in the training data set in addition to video data, the described approach can also be extended to applications of video-based object detection and segmentation. To this end, the measured image intensities can be associated with the 3D points with the aid of intrinsic and extrinsic sensor calibrations. The described emulation method can then be applied, wherein an image of the same size is included with the image intensities in addition to the depth image, and is further processed. From the emulated 3D points with associated emulated image intensities, an emulated image of the target sensor can then be generated. Analogously, the annotated labels for the target sensor can also be emulated.

If dense 3D data, such as those from a LiDAR sensor or stereo video recording, are available in the training data set in addition to radar data, the described approach can also be extended to applications of radar-based object detection and segmentation. Instead of the radar data of the training data set, which are comparatively sparse due to the measurement principle and are therefore unsuitable for modeling surfaces in the environment, the available dense 3D data are used according to the method described above for modeling the surfaces of the environment from the perspective of the target sensor. This model can then be used to discard obstructed radar measurements from the original training data set in the coordinate system of the target sensor and to generate new measurements. When selecting the 3D radar measurements, the properties of the (radar) target sensor, e.g. the total number of measured 3D points or local and spectral separability of reflexes, must be taken into account. If the installation position of the target sensor does not differ substantially from the positions of the training sensors, the speed of the original 3D points can be approximately used as the Doppler speed of the emulated 3D points.

The above-described approach for emulating sensor (raw) data of a target sensor can also be utilized online, e.g., in a vehicle or generally in a robotic device, to emulate and use or investigate an uninstalled target sensor in real-world operation. This means that a target sensor training data set is not necessarily generated from an original training data set, but a target sensor input data set is generally generated from an original input data set (wherein these input data sets are provided with ground truth information for training, but can also constitute input data sets without ground truth information for inference; accordingly, the sensor(s) providing the original input data set are not necessarily "training" sensors; that is, they do not necessarily provide training data).

Using the described approach, the raw data from training sensors can be used to emulate the raw data of a sensor that is not actually installed. However, this approach is unable to emulate information in areas where no data at all has been captured by the training sensors. That is, the visual range of the target sensor should be covered by the visual ranges of the training sensors. Otherwise, the emulated data in these ranges will remain empty, and would thereby differ from the data of a target sensor that is actually present. From this perspective, it is nonetheless still possible to emulate target sensors for the training of perception systems with the described approach whose assumed installation position is not located between the installed training sensors; for example, for a target sensor in the front bumper based on sensor data recorded with LiDAR sensors on the vehicle roof, as shown in FIG. 2. If the target sensor is therefore sufficiently close to the training sensor arrangement, the described approach can be used to achieve improved performance through sensor-specific training.

Figure 4:
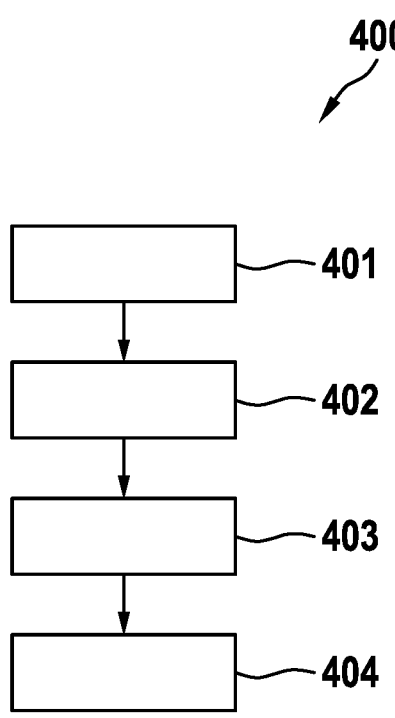
FIG. 4 shows a flowchart depicting a method that is used to generate input data for a machine learning model according to one embodiment.

In summary, a method is provided according to various embodiments, as shown in FIG. 4.

FIG. 4 shows a flowchart 400 depicting a method that is used to generate input data for a machine learning model according to one embodiment.

In 401, a point cloud is determined for at least one sensor, using points of surfaces detected by the sensor in the vicinity of the sensor.

In 402, a preliminary target sensor point cloud for a target sensor is generated by transforming, for the at least one sensor, points of the determined point cloud into points from the perspective of the target sensor according to the relative position of the target sensor to the at least one sensor.

In 403, a target sensor point cloud for the target sensor is generated using the preliminary target sensor point cloud, wherein points that are not detectable by the target sensor due to one or more surfaces for which points are present in the preliminary target sensor point cloud are eliminated in the target sensor point cloud.

In 404, the target sensor point cloud is used as input for the machine learning model.

The method of FIG. 4 can be carried out by one or more computers comprising one or more data processing units. The term "data processing unit" can be understood to mean any type of means that enables the processing of data or signals. For example, the data or signals can be processed according to at least one (i.e., one or more than one) specific function performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate assembly (FPGA), or any combination thereof. Any other way of implementing the respective functions described in more detail herein can also be understood as a data processing unit or logic circuitry. One or more of the method steps described in detail herein can be performed (e.g., implemented) by a data processing unit by one or more specific functions executed by the data processing unit.

The approach of FIG. 4 can serve, for example, to generate a control signal for a robotic device (from an output of the machine learning model). The term "robotic device" can be understood as relating to any technical system (with a mechanical part whose movement is controlled), such as a computer-controlled machine, a vehicle, a household appliance, an electric tool, a manufacturing machine, a personal assistant, or an access control system. Using the input data, the machine learning model can be trained to generate output data on whose basis such a technical system is controlled, and the technical system is then controlled accordingly, using the machine learning model.

Various embodiments can receive and use sensor signals from various sensors, such as video, radar, LiDAR, ultra-sonics, movement, thermal imaging, etc. The machine learning model processes the sensor data. This can include the classification of the sensor data or performing semantic segmentation on the sensor data, for example, in order to detect the presence of objects (in the environment in which the sensor data was obtained). Embodiments can be used to train a machine learning system and control a robot, e.g., robot manipulators autonomously in order to accomplish various manipulation tasks under various scenarios. In particular, embodiments are applicable to the control and monitoring of the performance of manipulation tasks, e.g., in assembly lines.

Although specific embodiments have been illustrated and described herein, the person skilled in the art recognizes that the specific embodiments shown and described can be substituted for a variety of alternative and/or equivalent implementations without departing from the scope of protection of the present disclosure. This application is intended to cover any adaptations or variations of the specific embodiments discussed herein. This disclosure is therefore intended to be limited only by the claims and the equivalents thereof.

The invention claimed is:

1. A method for generating input data for a machine learning model, comprising:
    capturing data, using at least one sensor, in an environment of the at least one sensor and from a perspective of the at least one sensor;
    determining, from the captured data, a point cloud including a first plurality of points corresponding to surfaces detected by the at least one sensor in the environment of the at least one sensor, the first plurality of points determined from the perspective of the at least one sensor;
    generating a preliminary target sensor point cloud of a target sensor by transforming the first plurality of points of the determined point cloud into a second plurality of points from a perspective of the target sensor based on a relative position of the target sensor to the at least one sensor, the perspective of the target sensor being different from the perspective of the at least one sensor;
    generating a target sensor point cloud as would be output by the target sensor by eliminating points of the second plurality of points from the preliminary target sensor point cloud, the eliminated points corresponding to surfaces, within a target range of the target sensor, but that are not detectable by the target sensor from the perspective of the target sensor; and
    using the target sensor point cloud as an input for training the machine learning model when no data has been captured from the perspective of the target sensor,
    wherein the eliminated points correspond to surfaces that are hidden from view of the target sensor from the perspective of the target sensor, but that are visible to the at least one sensor from the perspective of the at least one sensor,
    wherein the at least one sensor is installed in the environment,
    wherein the target sensor is not yet installed in the environment, and
    wherein the target sensor point cloud corresponds to data that would be generated by the target sensor when the target sensor is installed in the environment at a position resulting in the perspective of the target sensor.

2. The method according to claim 1, wherein generating the target sensor point cloud comprises:
    supplementing the preliminary target sensor point cloud with additional points which are included in the preliminary target sensor point cloud, and which correspond to a particular surface that is detectable by the target sensor from the perspective of the target sensor when the particular surface is present in the environment.

3. The method according to claim 1, wherein generating the target sensor point cloud comprises:
    generating a depth image representing locations of points of the preliminary target sensor point cloud from the perspective of the target sensor;
    morphologically opening the depth image; and
    generating the target sensor point cloud according to the morphologically opened depth image.

4. The method according to claim 1, wherein generating the target sensor point cloud comprises:

generating a disparity image representing locations of points of the preliminary target sensor point cloud from the perspective of the target sensor;

morphologically closing the disparity image; and generating the target sensor point cloud according to the morphologically closed disparity image.

5. The method according to claim 1, wherein:

the determination of the point cloud from the captured data includes using the first plurality of points detected by the at least one sensor from surfaces in a vicinity of the at least one sensor; and generating the preliminary target sensor point cloud includes transforming the first plurality of points into the second plurality of points from the perspective of the target sensor according to the relative position of the target sensor to the at least one sensor, and assembling the second plurality of points into the preliminary target sensor point cloud.

6. The method according to claim 1, wherein:

generating the target sensor point cloud includes generating a respective target sensor point cloud for each target sensor included in a target sensor arrangement including a plurality of target sensors; and using the target sensor point cloud includes using each respective target sensor point cloud as an input for the machine learning model.

7. The method according to claim 1, further comprising:

training the machine learning model to process sensor data from the perspective of the target sensor using the target sensor point cloud.

8. The method according to claim 7, further comprising:

collecting ground truth information for the first plurality of points of the point cloud determined for the at least one sensor;

transforming the ground truth information into ground truth information for the second plurality of points of the target sensor point cloud; and training the machine learning model using supervised learning using the target sensor point cloud as training input data and the transformed ground truth information.

9. The method according to claim 7, wherein:

generating the preliminary target sensor point cloud includes generating a respective preliminary target sensor point cloud for each target sensor included in a target sensor arrangement including a plurality of target sensors; and using the target sensor point cloud includes using each respective preliminary target sensor point cloud as an input for the machine learning model.

10. The method according to claim 1, wherein:

the at least one sensor includes a first sensor and a second sensor, and the target sensor is located between the first sensor and the second sensor.

11. The method according to claim 1, wherein transforming of the first plurality of points into the second plurality of points is based on a difference between a known position of the at least one sensor and an assumed installation position of the target sensor.

12. The method according to claim 1, wherein transforming the first plurality of points includes immediately discarding any points of the first plurality of points that are outside of a target range of the target sensor.

13. A sensor data processing system configured to carry out the method according to claim 1.

14. A non-transitory computer-readable medium which stores instructions that, when executed by a processor, cause the processor to perform the method according to claim 1.

* * * * *